Nov. 21, 1967
F. ENGEL ET AL
3,354,308
X-RAY ANALYSIS APPARATUS WITH MEANS TO MEASURE
THE CHARACTERISTIC X-RAY EMISSION FROM
AND THE DENSITY OF A MATERIAL
Original Filed Nov. 15, 1961
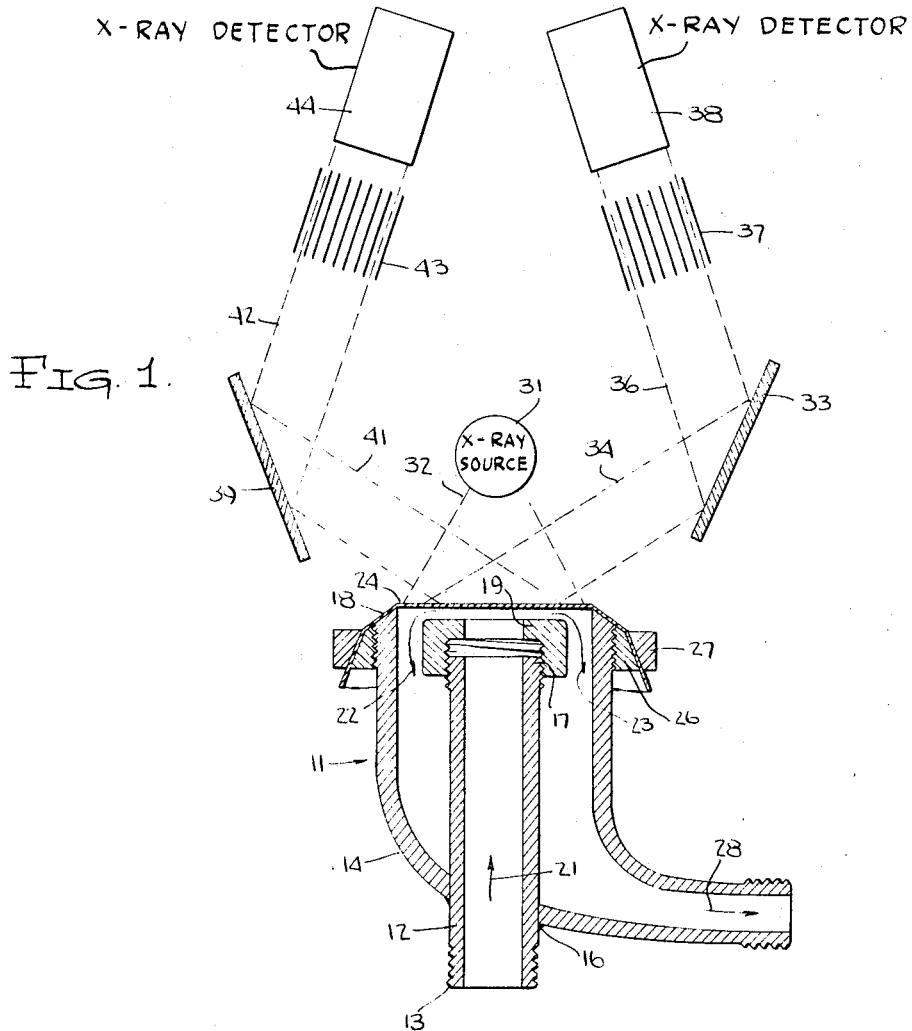
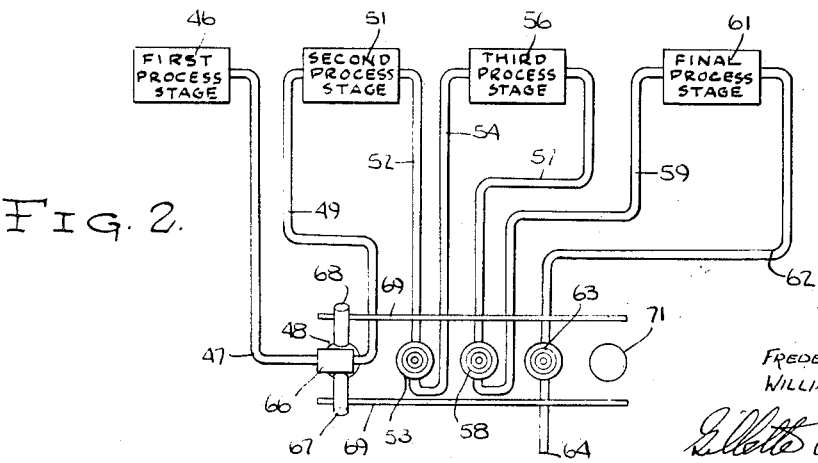
INVENTORS
FREDERICK ENGEL
WILLIAM R. KILEY
ATTORNEYS

United States Patent Office 3,354,308
Patented Nov. 21, 1967

3,354,308
APPARATUS WITH MEANS TO MEASURE THE CHARACTERISTIC X-RAY EMISSION FROM AND THE DENSITY OF A MATERIAL
Frederick Engel, Greenwich, and William R. Kiley, Ridgefield, Conn., assignors to Philips Electronics & Pharmaceutical Industries Corporation, New York, N.Y., a corporation of Delaware
Continuation of application Ser. No. 152,532, Nov. 15, 1961. This application Apr. 30, 1965, Ser. No. 454,770
8 Claims. (Cl. 250—51.5)

This invention is a continuation of our copending application Ser. No. 152,532, filed Nov. 15, 1961, now abandoned, and it relates to an apparatus for making X-ray spectroscopic analyses of moving samples, including slurries and other liquid samples.

In analyzing liquid samples, one of the problems is to keep the surface of the sample at a relatively fixed location with respect to both the X-ray source and the measuring apparatus even though the liquid material is in continuous flowing motion. Another problem, which is encountered particularly in slurries, is the variation of density of the slurry, which makes it difficult to obtain the percentage of a particular element in the solid part of the slurry.

These and other difficulties are overcome by a sample cell constructed in accordance with the present invention. This cell comprises an inlet pipe and an outlet pipe, usually in concentric relationship. In the space between the two is a metal member having a surface past which the slurry to be analyzed must flow, and the two pipes are sealed together to form an enclosure which is complete except for an open area opposite the metal surface. An X-ray permeable membrane closes off the opening leaving a gap between the inner surface of the membrane and the surface of the metal member to permit the slurry to flow through the inlet pipe and through this gap and into the outlet pipe.

The inlet pipe may advantageously be arranged concentrically within the outlet pipe with both pipes cut off so as to have an open end extending in the same direction as the outlet pipe extending slightly beyond the inlet pipe and being closed off by an X-ray permeable membrane. The open end of the inlet pipe can then serve as the metal member across which the slurry flows, and it may be made of a suitable material to emit fluorescent X-rays of a desired wave length under bombardment of the analyzing X-rays. Alternatively, an additional metal member may be added to the open end of the inlet pipe to provide a suitable X-ray fluorescent element. Fluorescent X-rays from the metal member from the inlet pipe pass through the slurry flowing over the gap and the reduction in intensity of these rays indicates the density of the slurry. Well-known X-ray techniques permit simultaneous analysis of the slurry for a particular chemical element.

The invention will be completely described in connection with the drawings, in which:

FIG. 1 shows a simple X-ray system using a sample cell constructed according to the invention; and FIG. 2 shows a system for analyzing the flow at different points of a chemical processing plant.

The apparatus of FIG. 1 is built around a sample cell indicated by reference character 11. The cell includes an inner pipe 12, the outer end 13 of which may be connected to a source of liquid to be analyzed. The liquid may be a pure liquid, or, as may frequently be the case, it may be a slurry consisting of solid particles carried by a liquid medium.

The pipe 12 extends through the wall of a larger pipe 14 and is sealed to it in the region 16 by being welded or by any other suitable means. The open inner end 17 of the pipe 12 is externally threaded and terminates within the larger pipe 14 and near the open end 18 of the latter, which extends slightly beyond the pipe 12.

The inner pipe 12 is the entrance pipe to the sample cell so that the liquid material to be analyzed flows through it in the direction of the arrow 21 and out of the open end 17 and into the surrounding space enclosed by the outer pipe 14, as indicated by the arrows 22 and 23. Even if the open end of the pipes 12 and 14 point upwardly, as shown in the drawing, the open end of the outer pipe must be closed off in some way to prevent at least part of the liquid from escaping. Furthermore, one of the objects of the invention is to restrain the flow in such a way as to keep the surface of the liquid at, or reasonably close to, a fixed level.

In this embodiment a thin X-ray permeable membrane 24 is stretched across the open end 18 to close it off. This membrane may be of a suitable plastic material, such as Mylar, for example, and it is held in place by being stretched over the inner part 26 of a clamping ring. The outer surface of the inner part of the clamping ring is tapered and a correspondingly tapered outer part 27 is pressed over the membrane 24 to hold it firmly in place.

While the membrane 24 is stretched taut, it is impossible to prevent some vibration of it when the pressure of the liquid changes due to momentary changes in the rate of flow. If this liquid is a slurry containing minute, usually crystalline, sharp-edged particles, it has been found that these particles of the solid material of the slurry can work in between the membrane 24 and the end 18 and puncture the membrane. Preferably, the outer end 18 of the pipe 14 is slightly beveled, as shown, so as to prevent any particles of the slurry from working their way into this region.

The exact position of the ring 19 upon the end 17 of the inner pipe 12 may be adjusted by screwing the internally threaded ring 19 to a greater or lesser distance from the inner surface of the membrane 24, the purpose being to create a gap which will not unduly constrict the sample flow but which will at all times keep the gap between the upper surface of the ring 19 and the membrane 24 substantially full of the flowing sample, thus assuring as uniform an X-ray surface as is possible. From the gap region the flowing sample follows the course indicated by the arrow 28 through the exit pipe 29.

A simplified X-ray analysis system for use with the sample cell 11 is also shown in FIG. 1. This system includes an X-ray generating tube 31 which generates a beam of X-rays 32. The X-rays in this beam fall upon the upper surface of the membrane 24 to irradiate substantially the entire surface of the membrane, and since the latter is highly permeable to X-rays, the flowing sample directly under the membrane, as well as the upper surface of the ring 19. The X-ray tube 31 is operated at an anode voltage which generates X-rays of sufficiently short wave length to induce fluorescence of the characteristic radiation of the particular chemical element for which the sample is being analyzed. For example, if the flowing sample is a slurry containing zinc ore in water and it is desired to determine the percentage of zinc in the solid particles in the sample, an X-ray tube with a tungsten anode operated at a voltage of 35,000 volts will cause emission of the zinc $K\alpha$ radiation. This fluorescent radiation is emitted in all directions and an analyzing crystal 33 is placed so as to intercept the zinc $K\alpha$ fluorescence traveling in a beam 34. The angle at which the beam 34 intercepts the surface of the analyzing crystal 33, which may be lithium fluoride or any other suitable crystal, is such as to cause X-rays having a wave length of about 1.435 Angstroms to be diffracted along a path 36 through a Soller slit collimator 37. After passing through the collimator 37, the diffracted beam 36 strikes an X-ray transducer 38 which may be, for example, a Geiger-Müller tube which transforms the X-radiation into an electrical signal. The intensity of this electrical signal is proportional to the amount of zinc present in the flowing sample.

The amount of zinc in the sample is dependent upon several factors. In the first place, the zinc may vary due to changes in the chemical processing, and it is this variation that the system is intended to measure. However, the zinc may vary simply because there is more or less solid material in the flowing sample without any change in the ratio of zinc to other elements of the solid material.

In order to eliminate variations in the density of the slurry from affecting computations of the percentage of zinc (or whatever material the sample is being analyzed for), a second X-ray signal is generated, the intensity of which depends upon the density of the slurry and is substantially independent of the chemical composition of the solid materials in the slurry. This second X-ray signal is generated by X-ray fluorescence of the upper surface of the ring 19 due to the X-rays of the beam 32. The fluorescent X-rays produced by the ring 19 are absorbed by the flowing sample according to the mass absorption law, which states that the intensity, I, of the fluorescent X-radiation emitted by the ring 19 is:

$$I = I_0 e^{-(\mu/\rho)\rho x}$$

wherein: $I_0$ is the initial intensity of the fluorescent radiation at the surface of the ring; $(\mu/\rho)$ is a constant of the absorbing material; $\mu$ is the linear absorption coefficient of the flowing sample; and $x$ is the thickness of the sample. Since, in the usual case, most of the absorption will be caused by the solid particles of a slurry sample, $\mu$ will vary with the amount of solid material; hence, the more solid material there is, the greater will be the absorption and the less will be the intensity I. If the sample is very watery, there will be little to impede the fluorescent X-rays given off by the ring 19. On the other hand, if there is relatively little water in the slurry compared to the amount of solid material present, the solid material will absorb the fluorescent X-rays from the ring 19. The material of which the ring is formed is chosen to have no characteristic X-ray wave lengths that would conflict wtih those of the material for which the sample is being analyzed. In the illustrative example in which a slurry is analyzed for its zinc content, the ring 19 may be made out of zirconium.

In order to measure the fluorescent X-rays from the ring 19, a second analyzing crystal 39 is placed so as to intercept the rays traveling along a beam 41. If a zirconium ring 19 is used, for example, the angle at which the X-ray beam 41 strikes the crystal 39 is such as to cause only X-rays having a wave length of .785 A., which is the K$\alpha$ wave length of zirconium, to be diffracted along a path 42. The path 42 passes through a second Soller slit collimator 43 and strikes a second transducer 44 which may be a Geiger-Müller tube, for example, or any of the other known varieties of X-ray transducers. The amplitude of the signal from transducer 44 may be used to control the chemical processing apparatus to keep the density of the slurry constant.

The sample cell of FIG. 1 may be used at any convenient point of a chemical processing plant. Frequently, it is desirable to employ more than one such cell in order to keep accurate track of a particular element as the sample passes through a succession of chemical processes. To take a specific example in order to clarify the description, it may be desirable to measure the amount of zinc present at various states of a chemical plant devoted to the production of zinc from a zinc-bearing ore. FIG. 2 shows a simplified schematic of such a system. The ore enters the system in a first processing stage 46 where it is subjected to chemical actions which are not relevant, per se, to the invention being described. The output of the first stage 46 is carried by means of a pipe 47 to a first sample cell 48 which may be exactly like the cell 11 of FIG. 1. After passing through the sample cell 48, the flowing sample travels along a pipe 49 to a second processing stage 51. The output of the second stage goes through a pipe 52 and a second sample cell 53 and a pipe 54 to the third stage 56. Similarly, the output of the third stage passes through a pipe 57 to a sample cell 58 and from there to a pipe 59 which is connected to a final processing stage 61. The output of the latter stage passes through a pipe 62 to a sample cell 63 and out through a pipe 64 which leads out of the processing area.

X-ray analysis is accomplished by means of an X-ray system similar to that shown in FIG. 1 and comprises an X-ray tube 66 and a pair of transducers 67 and 68 together with other apparatus which is shown in FIG. 1 but is not reproduced in FIG. 2. The components of the X-ray system travel upon a predetermined path, which may be defined by a pair of rails 69, that passes over each of the sample cells 48, 53, 58 and 63 and over an additional standard sample 71. As the X-ray system moves along the rails 69 it analyzes the sample in each of these sample cells to indicate the percentage of zinc at various points of the chemical processing. Ordinarily, the processing is arranged so that the zinc is withdrawn in the various stages and therefore the percentage of zinc decreases from stage to stage. If this percentage does not change between one stage and the next in the proper manner, the intensity of the fluorescent radiation of zinc K$\alpha$, as measured by one of the transducers, for example transducer 67, will indicate that something is wrong. Thereupon a proper change may be made in the processing reagents to bring the zinc percentage indicated back to the proper value.

The standard sample 71 is provided to give a reference reading which may be used to indicate drift in the electrical operation of the X-ray system. Ordinarily, the drift will be quite small over long periods of time and other means may be provided to measure it, but by measuring the radiation from the sample 71 at regular intervals and by referring the radiation thus measured back to the electrical circuits governing the operation of the X-ray apparatus, any drift may be compensated for quite easily.

While the invention was described with particular reference to the measurement of the fluorescent radiation of zinc K$\alpha$, which may be accomplished by using NaCl as the crystal 33 and placing it at a $2\theta$ angle of 29.49°, any other chemical element may be easily measured by locating the crystal 33 at a different angle and, if necessary, by using other crystallizing materials in place of NaCl in accordance with well known techniques in X-ray spectrography. Similarly, other materials may be used for the ring 19 (or the surface of the ring) instead of zirconium, but zirconium is very satisfactory because it has a penetrating radiation and when used as a standard of comparison for zinc ore processing the characteristic radiation lines of zirconium and zinc do not interfere with each other. As is well known, the zirconium K$\alpha$ radiation may be measured by using a LiF crystal set at a $2\theta$ angle of 22.51°.

Still further modifications may be made in the apparatus without departing from the scope of the invention as determined by the following claims.

What is claimed is:

1. An X-ray measuring instrument for measuring material having first pre-determined X-ray fluorescence characteristics comprising:
    (a) a sample cell comprising
        (1) a first hollow pipe having an open end,
        (2) a second hollow pipe extending into said first pipe and sealed liquid-tight thereto and having an open end within said first pipe facing in the same direction as the open end of said first pipe,
        (3) an annular surface having second pre-determined X-ray fluorescence characteristics including at least one fluorescent wavelength different from said material, said annular surface being located on said open end of said second pipe, and (4) an X-ray permeable, liquid-tight membrane covering said open end of said first pipe and spaced from said annular surface to permit said material to flow from one of said pipes to the other only by flowing through the annular space between said annular surface and said membrane;

(b) an X-ray source emitting X-rays having wavelengths shorter than the fluorescent X-rays of said annular surface and of said material, the X-rays from said source being directed through said annular space onto said surface;

(c) a first dispersive analyzing system comprising
   (1) means to select fluorescent X-rays from a particular element in said material, and
   (2) means to measure the intensity of the selected X-rays; and (d) a second dispersive analyzing system comprising
   (1) means to select X-rays having said one fluorescent wavelength, and
   (2) means to measure the intensity thereof to determine the density of said element in said material.

2. The X-ray measuring instrument of claim 1 in which said second pipe comprises an annular ring attached thereto and forming said open end thereof, said annular surface being on said annular ring.

3. The X-ray measuring instrument of claim 1 in which said second pipe comprises
   (a) a first section sealed liquid-tight to said first pipe; and
   (b) a second section longitudinally movable with respect to said first section and extending beyond said first section, said annular surface being on the open end of said second section.

4. The X-ray measuring instrument of claim 1 in which said open end of said first pipe is bevelled and said membrane is a thin, flexible, plastic membrane.

5. The X-ray measuring instrument of claim 4 comprising in addition:
   (a) a first clamping ring attached to the outer surface of said first pipe at the open end thereof and having a tapered outer surface; and
   (b) a second clamping ring having an inner surface tapered at an angle corresponding to the taper of the outer surface of said first ring to fit thereover and to clamp said membrane taut across the bevelled end of said first pipe.

6. An X-ray measuring instrument comprising an annular metal member having an annular surface with characteristic X-ray fluorescence at predetermined wave lengths; an inlet pipe attached concentrically with respect to said metal member to direct a flow of material to be analyzed radially over the surface of said metal member; an outlet pipe surrounding said metal member to receive the flow of said material after said material has passed radially across said annular surface of said metal member; liquid-tight walls sealing said inlet to outlet pipe, said walls having edge portions defining an opening opposite the surface of said metal member; a membrane across said opening and forming in combination with said walls a completely enclosed liquid-tight chamber, said membrane being substantially transparent to X-rays having the wave length of the characteristic fluorescent X-rays of said metal member and of said material to be analyzed; an X-ray source emitting X-rays having wave lengths shorter than the fluorescent X-rays of said metal member and of said material to be analyzed, said member being located in the path of X-rays from said source; a first dispersive analyzing system comprising means to select said fluorescent X-rays from a particular element in said material to be analyzed and means to measure the intensity of the selected X-rays; and a second dispersive analyzing system comprising means for selecting said fluorescent X-rays of said metal member and means to measure the intensity thereof to determine the density of said material to be analyzed.

7. An X-ray measuring system comprising a plurality of sample cells each having an outer pipe open at one end and an inner pipe extending through the wall of said outer pipe and sealed water-tight thereto and open at one end and having an annular surface facing in the same direction as the open end of said outer pipe, said annular surface having predetermined X-ray fluorescence characteristics, the open end of said outer pipe extending beyond said annular surface, a thin X-ray permeable membrane closing the open end of said outer pipe, and an outlet pipe connected to said outer pipe to receive the material to be measured after the same has passed through said inner pipe into said outer pipe, said sample cells being located adjacent one another; an X-ray measuring device comprising a source of X-radiation emitting X-rays having wave lengths shorter than the fluorescent X-rays of said annular surface and of an element in said material to be measured; a first dispersive analyzing system comprising means to select said fluorescent X-rays from said element and means to measure the intensity of the selected X-rays; a second dispersive analyzing system comprising means for selecting the fluorescent X-rays from said annular surface and means to measure the intensity thereof to determine the concentration of said element in said material to be analyzed; means to transport said X-ray measuring device to irradiate the membranes of each of said cells in sequence in order to cause both the annular surface of each of said inner pipes, in turn, and the material flowing through the gap between the respective one of said inner pipes and the respective one of said membranes to fluoresce with characteristic X-radiation, and utilization means connected to said analyzing systems to be energized thereby according to the intensity of X-ray fluorescence from each of said sample cells.

8. The X-ray measuring system of claim 7 comprising in addition a standard sample located adjacent to one of said cells, said means to transport said X-ray measuring device over said standard sample to irradiate said standard sample in regular sequence with said sample cells, said utilization means also being energized by the intensity of X-ray fluorescence from said standard sample.

References Cited

UNITED STATES PATENTS

| 2,791,698 | 5/1957 | Dyroff et al. | 250—43.5 |
| 2,897,371 | 7/1959 | Hasler | 250—51.5 X |
| 3,020,795 | 2/1962 | McKinney et al. | 88—14 |
| 3,198,944 | 8/1965 | Furbee | 250—51.5 |

FOREIGN PATENTS

| 793,301 | 4/1958 | Great Britain. |

RALPH G. NILSON, *Primary Examiner.*

W. F. LINDQUIST, *Assistant Examiner.*